(12) United States Patent
Forster

(10) Patent No.: US 7,768,407 B2
(45) Date of Patent: Aug. 3, 2010

(54) FOLDABLE RFID DEVICE INTERPOSER AND METHOD

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 564 days.

(21) Appl. No.: 11/766,845

(22) Filed: Jun. 22, 2007

(65) Prior Publication Data

US 2008/0315992 A1   Dec. 25, 2008

(51) Int. Cl.
G08B 13/14 (2006.01)
(52) U.S. Cl. ............... 340/572.8; 340/572.7; 340/10.1; 235/487; 235/492
(58) Field of Classification Search ............. 340/572.8, 340/572.7, 572.1, 10.1, 10.3; 235/487, 492; 257/686, 784; 361/736, 760, 776
See application file for complete search history.

(56) References Cited

U.S. PATENT DOCUMENTS

| | | | |
|---|---|---|---|
| 5,822,685 A | 10/1998 | Forster | |
| 6,046,668 A | 4/2000 | Forster | |
| 6,281,797 B1 | 8/2001 | Forster et al. | |
| 6,369,772 B1 | 4/2002 | Forster | |
| 6,456,225 B1 | 9/2002 | Forster | |
| 6,480,062 B1 | 11/2002 | Forster | |
| 6,483,473 B1 | 11/2002 | King et al. | |
| 6,501,435 B1 | 12/2002 | King et al. | |
| 6,580,357 B1 | 6/2003 | Forster et al. | |
| 6,628,237 B1 | 9/2003 | Forster et al. | |
| 6,630,910 B2 | 10/2003 | Forster et al. | |
| 6,642,897 B2 | 11/2003 | Forster et al. | |
| 6,646,555 B1 | 11/2003 | Forster et al. | |
| 6,720,865 B1 | 4/2004 | Forster et al. | |
| 6,734,796 B2 | 5/2004 | Forster et al. | |
| 6,744,367 B1 | 6/2004 | Forster | |
| 6,774,466 B1 * | 8/2004 | Kajiwara et al. | ............ 257/673 |
| 6,778,088 B1 | 8/2004 | Forster | |
| 6,799,027 B1 | 9/2004 | Forster | |
| 6,806,842 B2 | 10/2004 | King et al. | |
| 6,828,941 B2 | 12/2004 | King et al. | |
| 6,847,912 B2 | 1/2005 | Forster | |
| 6,853,345 B2 | 2/2005 | King et al. | |
| 6,853,347 B2 | 2/2005 | Forster et al. | |
| 6,894,616 B1 | 5/2005 | Forster | |
| 6,895,226 B1 | 5/2005 | Forster et al. | |
| 6,895,655 B2 | 5/2005 | Forster et al. | |
| 6,903,704 B2 | 6/2005 | Forster et al. | |
| 6,914,562 B2 | 7/2005 | Forster | |
| 6,975,834 B1 | 12/2005 | Forster | |
| 6,985,119 B2 | 1/2006 | Forster et al. | |
| 7,012,531 B2 | 3/2006 | Fries et al. | |

(Continued)

Primary Examiner—Hung T. Nguyen

(57) ABSTRACT

An RFID device interposer has folded ends that bring conductive lead end portions of conductive leads of the interposer to an underside of the interposer. The central conductive lead portions of the conductive leads remain on an upper surface of a dielectric substrate of the interposer. The folded ends of the interposer may be held together with an adhesive, or with thermal compression bonding. The interposer may also have an additional conductive material layer on an underside of the dielectric substrate. The conductive material layer may be capacitively coupled to the conductive leads of the interposer. The interposer may be tuned by varying the pressure used to secure the folded ends. This may be used to provide a better impedance match between a chip of the interposer, and the conductive leads and an antenna to which the interposer is coupled.

22 Claims, 4 Drawing Sheets

U.S. PATENT DOCUMENTS

| | | | |
|---|---|---|---|
| 7,046,122 B1 | 5/2006 | Forster | |
| 7,046,957 B1 | 5/2006 | Farr et al. | |
| 7,055,754 B2 | 6/2006 | Forster | |
| 7,057,562 B2 | 6/2006 | Forster et al. | |
| 7,059,518 B2 | 6/2006 | Forster | |
| 7,088,248 B2 | 8/2006 | Forster | |
| 7,093,345 B2 | 8/2006 | Forster et al. | |
| 7,098,850 B2 | 8/2006 | King et al. | |
| 7,102,520 B2 | 9/2006 | Liu et al. | |
| 7,109,867 B2 | 9/2006 | Forster | |
| 7,123,204 B2 | 10/2006 | Forster et al. | |
| 7,154,283 B1 | 12/2006 | Weakley et al. | |
| 7,158,033 B2 | 1/2007 | Forster | |
| 7,158,037 B2 | 1/2007 | Forster et al. | |
| 7,164,353 B2 | 1/2007 | Puleston et al. | |
| 7,170,415 B2 | 1/2007 | Forster | |
| 7,180,423 B2 | 2/2007 | Forster et al. | |
| 7,190,319 B2 | 3/2007 | Forster et al. | |
| 7,191,507 B2 | 3/2007 | Forster et al. | |
| 7,193,563 B2 | 3/2007 | King et al. | |
| 7,212,127 B2 | 5/2007 | Jacober et | |
| 7,224,273 B2 | 5/2007 | Forster | |
| 7,224,280 B2 | 5/2007 | Ferguson et al. | |
| 7,225,992 B2 | 6/2007 | Forster | |
| 7,233,250 B2 | 6/2007 | Forster | |
| 7,234,642 B2 | 6/2007 | Forster | |
| 7,239,287 B2 | 7/2007 | Forster | |
| 7,273,173 B2 | 9/2007 | Forster | |
| 7,275,040 B2 | 9/2007 | Forster et al. | |
| 7,292,148 B2 | 11/2007 | Forster | |
| 7,295,117 B2 | 11/2007 | Forster et al. | |
| 7,295,161 B2 * | 11/2007 | Gaucher et al. | 343/700 MS |
| 7,298,266 B2 | 11/2007 | Forster | |
| 7,298,267 B2 | 11/2007 | Forster | |
| 7,298,330 B2 | 11/2007 | Forster et al. | |
| 7,298,343 B2 | 11/2007 | Forster et al. | |
| 7,306,162 B2 | 12/2007 | Forster | |
| 7,307,527 B2 | 12/2007 | Forster | |
| 2005/0012616 A1 | 1/2005 | Forster et al. | |
| 2006/0043199 A1 | 3/2006 | Baba et al. | |

* cited by examiner

FOLDABLE RFID DEVICE INTERPOSER AND METHOD

BACKGROUND OF THE INVENTION

1. Field of the Invention

The invention is in the field of radio frequency identification (RFID) devices, and methods for making such devices.

2. Description of the Related Art

Radio frequency identification (RFID) tags and labels have a combination of antennas and analog and/or digital electronics, which may include for example communications electronics, data memory, and control logic. RFID tags and labels are widely used to associate an object with an identification code. For example, RFID tags are used in conjunction with security locks in cars, for access control to buildings, and for tracking inventory and parcels. Some examples of RFID tags and labels appear in U.S. Pat. Nos. 6,107,920, 6,206,292, and 6,262,692.

RFID tags and labels include active tags, which include a power source, and passive tags and labels, which do not. In the case of passive tags, in order to retrieve the information from the chip, a base station or reader sends an excitation signal to the RFID tag or label. The excitation signal energizes the tag or label, and the RFID circuitry transmits the stored information back to the reader. The reader receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

In many applications, it is desirable to reduce the size of the electronics as small as possible. In order to interconnect very small chips with antennas in RFID inlets, it is known to use a structure variously called "straps," "interposers," and "carriers," to facilitate inlay manufacture. Interposers include conductive leads or pads that are electrically coupled to the contact pads of the chips for coupling to the antennas. These pads provide a larger effective electrical contact area than those of integrated circuits (ICs). The larger area reduces the accuracy required for placement of ICs during manufacture while still providing effective electrical connection. IC placement and mounting are serious limitations for high-speed manufacture. The prior art discloses a variety of RFID strap or interposer structures, typically using a flexible substrate that carries the interposer's contact pads or leads.

Improvements are desirable in many aspects of RFID devices in general, and in interposers for such devices.

SUMMARY OF THE INVENTION

According to an aspect of the invention, an interposer for an RFID device has folded ends.

According to another aspect of the invention, an interposer for an RFID device includes a conductive layer that is capacitively coupled to conductive leads of the interposer. The interposer may be tuned by varying the thickness of a dielectric material between the conductive leads and the conductive layer. The interposer may have folded ends that fold around edges of the conductive layer.

According to yet another aspect of the invention, an RFID device interposer is tunable by varying thickness of folded interposer ends. The thickness of the folded interposer ends may be varied by varying the pressure used to compress the folded ends, such as in a thermal compression process.

According to still another aspect of the invention, an interposer for an RFID device includes: a dielectric substrate; and conductive leads on an upper surface of the dielectric substrate. Ends of the interposer are folded to put substrate end portions and conductive lead end portions underneath a central substrate portion and conductive lead central portions, with the conductive lead end portions facing downward.

According to a further aspect of the invention, a method of making an interposer for an RFID device includes the steps of: forming conductive leads on a top surface of a dielectric substrate; folding substrate end portions and conductive lead end portions underneath a central substrate portion; and securing the substrate end portions and the conductive lead portions in a folded configuration.

According to a still further aspect of the invention, an interposer for an RFID device includes: a dielectric substrate; and conductive leads on an upper surface of the dielectric substrate. Ends of the interposer transition from a substantially-planar first configuration in a center of the interposer to a second configuration in which conductive lead end portions are offset from conductive lead central portions of the conductive leads.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

An RFID device interposer has folded ends that bring conductive lead end portions of conductive leads of the interposer to an underside of the interposer. The central conductive lead portions of the conductive leads remain on a top side or upper surface of a dielectric substrate of the interposer. The folded ends of the interposer may be held together with an adhesive, or with thermal compression bonding. The interposer may also have an additional conductive material layer on an underside of the dielectric substrate. The conductive material layer may be capacitively coupled to the conductive leads of the interposer. The folded ends of the dielectric substrate may be configured so as to completely cover the underside of the conductive material layer after the folding is accomplished. The interposer may be tuned by varying the pressure used to secure the folded ends. Different pressures may be used to adjust the capacitive coupling between the conductive layer and the conductive leads. This may be used to provide a better impedance match between a chip of the interposer, and the conductive leads and an antenna to which the interposer is coupled. The folded-end interposer provides an inexpensive way of coupling conductive leads across antennas with multiple turns. In addition the interposer may be tunable as described above. A further advantage is that the interposer may have a more uniform thickness, with the relative thickness of the folded ends compensating to a degree for the increased thickness in the middle of the interposer due to the presence of the chip.

Figure 1:
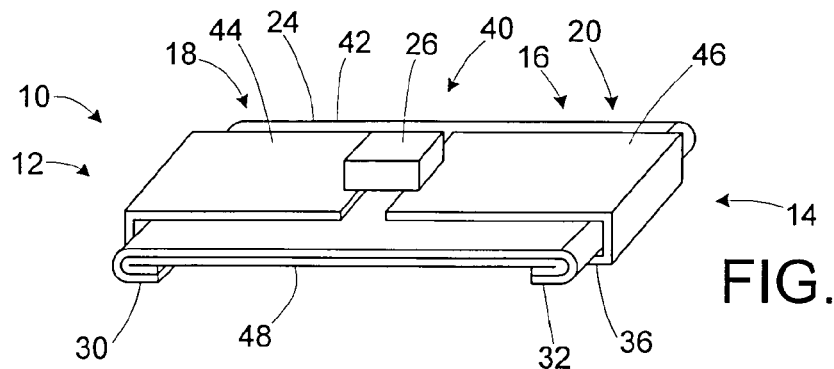
FIG. 1 is an oblique view of an RFID device interposer in accordance with an embodiment of the present invention.
Figure 2:
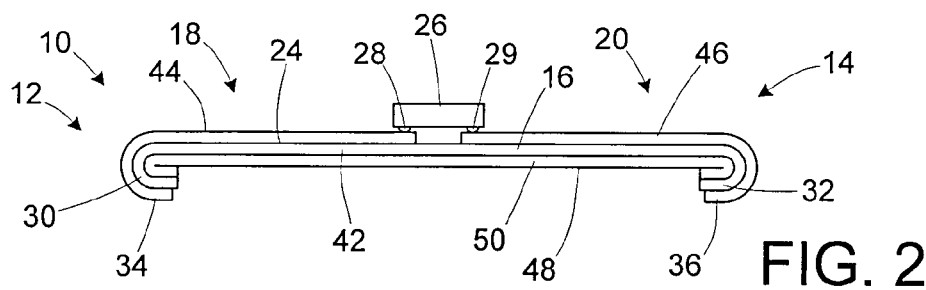
FIG. 2 is a cross-sectional view of the interposer of FIG. 1.

FIGS. 1 and 2 show an interposer 10 with folded interposer ends 12 and 14. The interposer 10 includes a dielectric substrate 16, and conductive leads 18 and 20 on an upper surface 24 of the dielectric substrate 16. A chip 26 has contacts 28 and 29 that are electrically connected to the conductive leads 18 and 20. The chip 26 is an integrated circuit device used for communication with outside devices, by sending and/or receiving signals via an antenna to which the interposer 10 is attached.

The interposer folded ends 12 and 14 include folded dielectric substrate end portions 30 and 32 and folded conductive lead end portions 34 and 36. A central interposer portion 40 remains unfolded. The central interposer portion 40 includes a central dielectric substrate portion 42 and conductive lead central portions 44 and 46. The interposer ends 12 and 14 are folded over so as to put the substrate end portions 30 and 32 and the conductive lead end portions 34 and 36 underneath the central substrate portion 42 and the central conductive lead portions 44 and 46.

The interposer end portions 12 and 14 may be secured by attaching the substrate end portions 30 and 32 to the central substrate portion 42. This securement may be done with a suitable adhesive, such as a suitable pressure-sensitive adhesive. An adhesive layer 48 may be placed on a lower surface 50 of the dielectric substrate 16. The adhesive layer 48 may be placed by well-known coating or spraying operations. The adhesive layer 48 may be a uniform layer, such as shown in the figures, or alternatively may be a patterned layer that covers only a portion of the lower substrate surface 50. As the interposer ends 12 and 14 are folded the portion of the adhesive layer 48 covering the substrate end portions 30 comes into contact with the portion of the adhesive layer 48 covering the corresponding parts of the central substrate portion 42. Under pressure the two portions of the adhesive layer 48 bond together at each of the interposer ends 12 and 14. This secures the interposer ends 12 and 14.

As an alternative or in addition, the securement may be done with thermal compression bonding. Such thermal compression bonding involves heating the substrate material at the interposer ends 12 and 14 while the ends 12 and 14 are under pressure. This causes reflowing of some of the substrate material at the interposer ends 12 and 14. Upon cooling the substrate end portions 30 and 32 become firmly attached to the central substrate portion 42.

It will be appreciated that other suitable methods may be used to secure the folded interposer ends 12 and 14. An example of another alternative is ultrasonic bonding.

The dielectric substrate 16 may be a polymer material, such as poly(ethylene terephthalate) (PET). Alternatively, the dielectric substrate 16 may be a paper substrate. A wide variety of other suitable materials may be used for the dielectric substrate 16. Examples of suitable materials for the RFID device substrate and the strap substrate include, but are not limited to, high glass-transition-temperature polycarbonate, poly(ethylene terephthalate) (PET), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper.

The conductive leads 18 and 20 may be aluminum or another suitable metal deposited onto the substrate 16. Alternatively the conductive leads 18 and 20 may be any of a wide variety of suitable conductive materials, such as conductive inks. Variety of suitable printing methods may be used for placing conductive inks in a suitable pattern for the conductive leads 18 and 20. Stamping and plating are other possible methods for putting the conductive leads 16 and 18 into place.

It will be appreciated that the conductive leads 18 and 20 may have any of a wide variety of suitable shapes. Examples include rectangular and triangular shapes.

The interposer ends 12 and 14 may be folded in any of a variety of suitable ways. One way that the folding can be accomplished is to move the interposer 10 through a turning die, a die having shaped surfaces that gradually turn the ends of the interposer 10 until the ends are folded over. After the folding a pair of pinch rollers may be used to press the ends together. Such pressing may activate an adhesive to adhesively seal the interposer ends 12 and 14. The adhesive may be activatable by other methods. Alternatively the pressing may be used in conjunction with heating to thermal compression bond the interposer ends 12 and 14.

Figure 3:
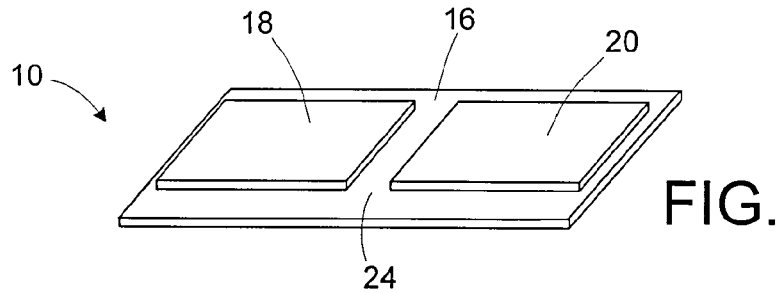
FIG. 3 is an oblique view illustrating a first step in the fabrication of the interposer of FIG. 1.
Figure 4:
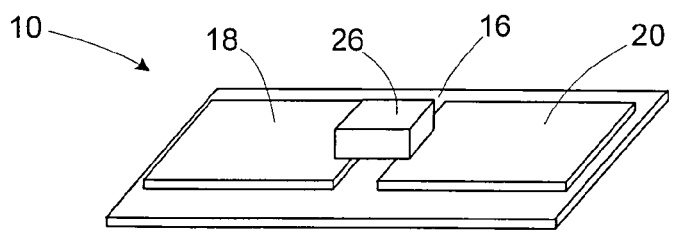
FIG. 4 is an oblique view illustrating a second step in the fabrication of the interposer of FIG. 1.
Figure 5:
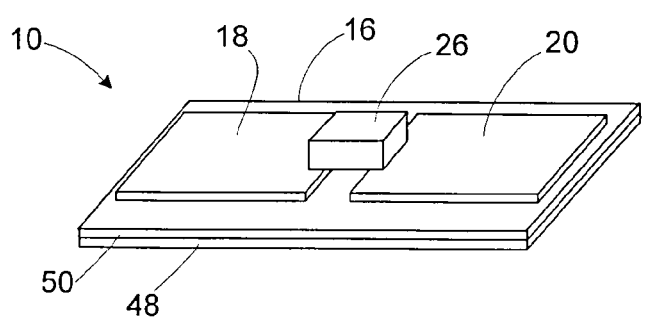
FIG. 5 is an oblique view illustrating a third step in the fabrication of the interposer of FIG. 1.

FIGS. 3-6 show steps in the production of the interposer 10. In FIG. 3 the conductive leads 18 and 20 are placed on the dielectric substrate 16. The conductive leads 18 and 20 are formed as described above on the upper surface 24 of the dielectric substrate 16. In FIG. 4 the chip 26 is attached to the conductive layers 18 and 20. In doing so the contacts 28 and 29 (FIG. 2) of the chip 26 are placed in contact with the conductive leads 18 and 20. In FIG. 5 the adhesive layer 48 is placed on the lower surface 50 of the substrate 16.

Figure 6:
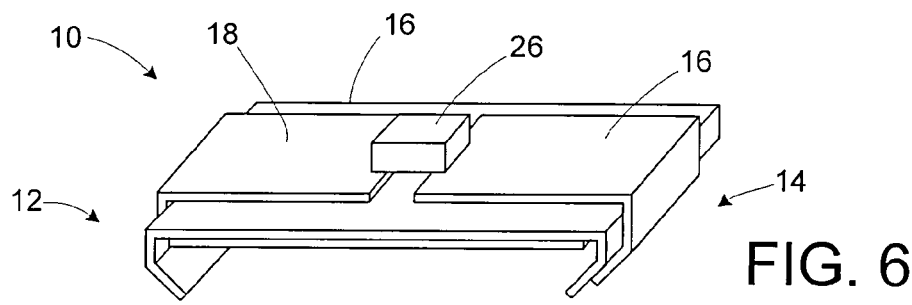
FIG. 6 is an oblique view illustrating a fourth step in the fabrication of the interposer of FIG. 1.

FIG. 6 illustrates the turning of the interposer ends 12 and 14. This turning may be accomplished using a turning die, as described above. Finally, the interposer ends 12 and 14 are secured. This securement may be done adhesively under pressure, such as from a pair of pinch rollers. Alternatively pressure and heating may be combined, as in the thermal compression bonding described above. Other alternatives for the securement have also been described above. The result from the securing is the interposer 10 shown in FIG. 1.

The process illustrated in FIGS. 3-6 may be a roll-to-roll process or a sheet process, for making multiple interposers 10 on a single sheet or web of substrate material. The multiple interposers 10 may be singulated by cutting or another suitable physical separation processes. Examples of methods and devices for physical separation of interposers from webs may be found in commonly-owned U.S. Pat. No. 6,951,596, which is incorporated herein in its entirety.

It will be appreciated that some of the steps in the process described above may be performed in a different order than is described above. For example, placement of the chip 26 may be delayed until after formation of the folded interposer ends 12 and 14, if desired.

Figure 7:
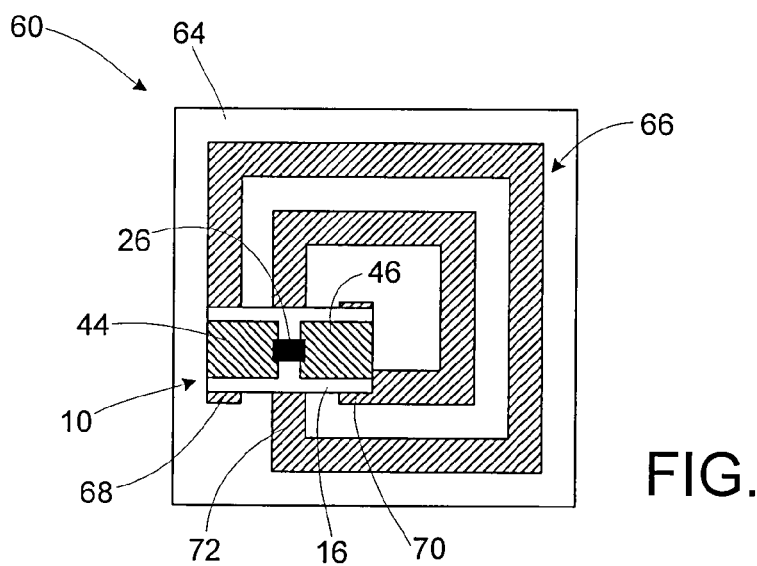
FIG. 7 is a plan view of an RFID device that incorporates the interposer of FIG. 1.
Figure 8:
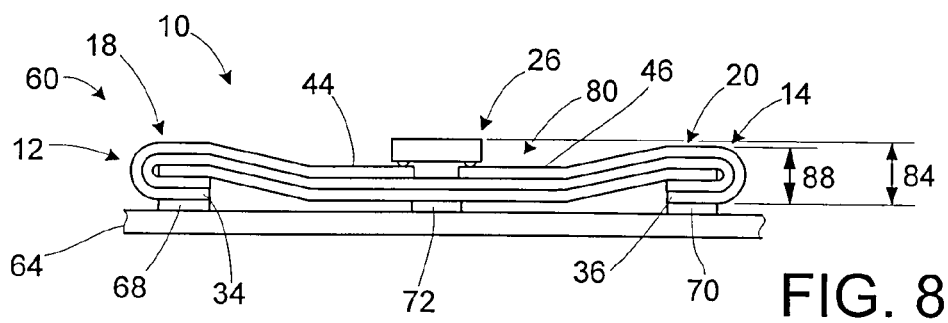
FIG. 8 is a cross-sectional view of the RFID device of FIG. 7.

Turning now to FIGS. 7 and 8, the interposer 10 is shown as part of an RFID device 60. The RFID device 60 may be a tag or a label. The RFID device 60 also includes a device substrate 64, and an antenna 66 formed on the device substrate 64. It will be appreciated that the RFID device 60 may include many additional structures and/or features, for example protective layers, printable layers, adhesive layers, and release layers. The antenna 66 is shown as a coil antenna having multiple turns between antenna ends 68 and 70. The interposer 10 is attached to the antenna 66, with the conductive lead end portions 34 and 36 in contact with or otherwise electrically coupled to the respective antenna ends 68 and 70. The attachment of the interposer 10 to the rest of the RFID device 60 may be accomplished by any of a variety of suitable methods, such as by welding, crimping, or use of adhesive. The conductive lead end portions 34 and 36 may be attached to the antenna ends 68 and 70 using a conductive adhesive. However the attachment of the interposer 10 to the rest of the RFID device 60 does not necessarily involve attaching the conductive lead end portions 34 and 36 to the antenna ends 68 and 70. One alternative is to have the middle portion of the adhesive layer 48 (FIG. 1) adhesively attach the interposer 10 to the substrate 64 and an intermediate turn 72 of the antenna 66. Since no conductive material is in contact with the intermediate turn 72, the interposer does not directly electrically couple to the intermediate turn 72 of the antenna 66. The central substrate portion 42 prevents contact between the intermediate turn 72 and the central conductive lead portions 44 and 46.

The interposer 10 may be placed in contact with the antenna 66 by any of a variety of machines or devices, including roll-to-roll process devices, devices involving rollers, and pick-and-place devices. Examples of roll-to-roll process may be found in U.S. Pat. No. 6,951,596 and U.S. Patent Application Publication No. 2007/0039687, both of which are incorporated herein in their entireties.

The folded interposer ends 12 and 14 may aid in providing a more uniform thickness for the installed interposer 10. As the interposer 10 engages the rest of the RFID device 60, the center part of the interposer 10 is pressed down into a space 80 between the lower parts of the folded interposer ends 12 and 14. The folded interposer ends 12 and 14 have a thickness 84, which is greater than the thickness 88 of the substrate 16 and the conductive leads 18 and 20 in the central interposer portion 40. This provides in essence thicker portions or "bumps," at the interposer ends 12 and 14. These thicker portions compensate to a degree for the thickness of the chip 26. By forcing the center interposer portion 40, along with the chip 26, into a space or well of sorts between the interposer ends 12 and 14, the interposer 10 has a more uniform thickness, relative to interposers without folded ends.

To give one example, the chip 26 may have a thickness of 180 μm, with the contacts 28 and 29 having a thickness of 18 μm. If the substrate has a thickness of 50 μm, then if the substrate 16 does not have folded ends there is a thickness difference of 198 μm between the center and sides of the interposer. However, with the folded ends this thickness difference is reduced to 148 μm. Thus the thickness of the central "bump" of the interposer 10 may be reduced by 25% or more by use of the folded ends 12 and 14.

Figure 9:
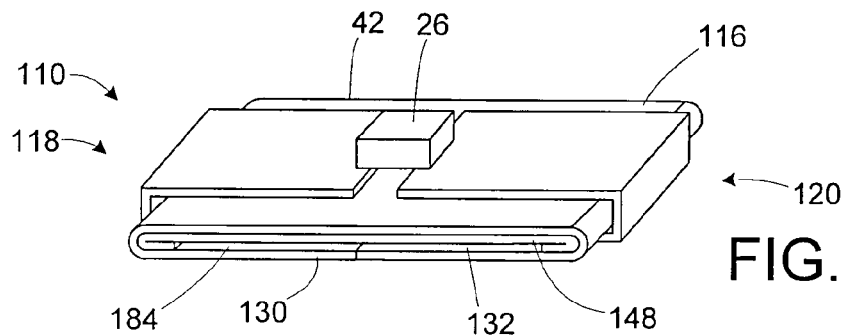
FIG. 9 is an oblique view of an alternate embodiment RFID device interposer in accordance with the present invention.
Figure 10:
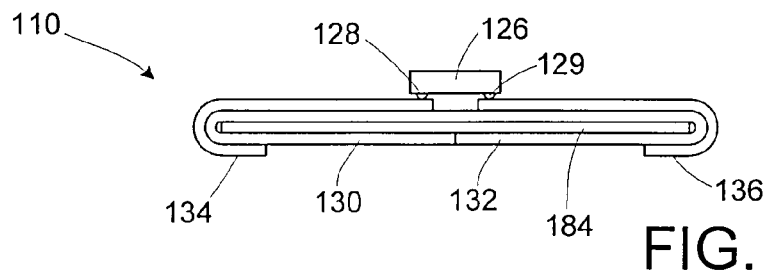
FIG. 10 is a cross-sectional view of the alternate embodiment interposer of FIG. 9.
Figure 11:
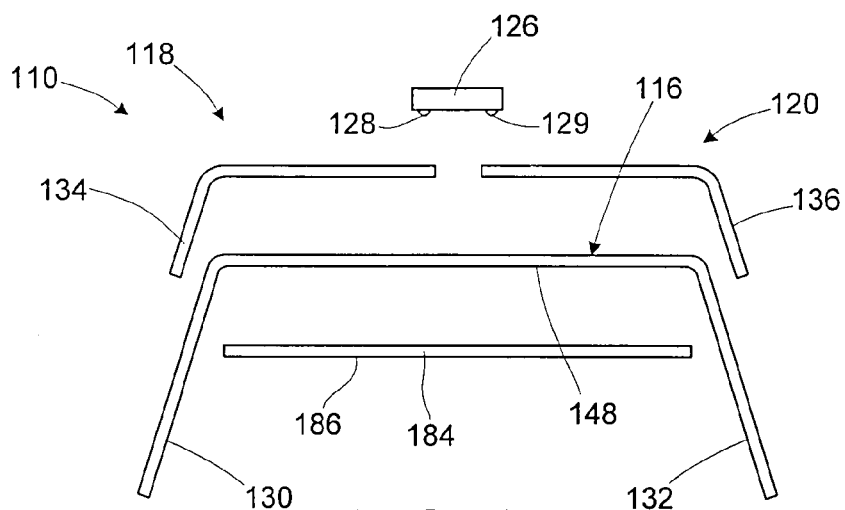
FIG. 11 is an exploded side view of the alternate embodiment RFID device interposer of FIG. 9.

FIGS. 9-11 show an alternate embodiment, an interposer 110 that has a conductive layer 184 attached to a lower surface 150 of the dielectric substrate 116. The interposer 110 has conductive leads 118 and 120 that may be similar to the conductive leads 18 and 20 of the RFID interposer 10 (FIG. 1). The RFID interposer 110 also has a chip 126 that has contacts 128 and 129 that are electrically coupled to the conductive leads 118 and 120.

Substrate end portions 130 and 132 may substantially cover a bottom surface 186 of the conductive layer 184, when the substrate end portions 130 and 132 are wrapped around to form folded interposer ends 112 and 114. Thus the substrate end portions 130 and 132 may extend substantially farther than conductive lead end portions 134 and 136. The conductive lead end portions 134 and 136 may extend about the same distance underneath as the folded conductive end portions 34 and 36 of the interposer 10 (FIG. 1). The extension of the substrate end portions 130 and 132 to cover the bottom surface 186 may be done to prevent the material of the conductive layer 184 from being directly electrically coupled to turns of a coil antenna, such as the intermediate turn 72 of the antenna 66 (FIG. 7).

Alternatively, the conductive layer 184 could be allowed to make electrical contact with one or more intermediate antenna turns 72. Connecting one or more of the intermediate turns 72 to the conductive layer 184 could serve to capacitively couple part of the antenna 66 to both of the chip contacts 128 and 129. This would provide an additional coupling between the antenna 66 and the contacts 128 and 129, which would also still be directly electrically coupled to other parts of the antenna 66, such as ends of the antenna 66. This could potentially create multiple differently tuned responses.

Another possible reason for making electrical contact between the conductive layer 184 and one or more intermediate turns 72 is to short out some of the coils of a coil antenna to effectively tune the antenna. Using this mechanism, the tuning of the antenna 66 may be controllable by controlling a gap between the end portions 130 and 132. It will be appreciated that the principles described do not apply only to coil antennas, but may also apply to other types of antennas, such as UHF antennas.

A top surface 188 of the conductive layer 184 may be adhesively or otherwise attached to the bottom surface 150 of the dielectric substrate 116. The conductive layer 184 may be made of a suitable deposited metal, metal foil, or other electrically conductive material. Example materials include copper, silver ink, and aluminum. The conductive layer 184 should be of adequate conductivity such that the loss of RF energy coupled through the layer 184 is small relative to other energy losses in the device. Any of a variety of suitable thicknesses may be used, for example (without limitation) thicknesses from 500 nm to 18 μm. The conductive layer 184 may be made of the same material as the conductive leads 118 and 120.

In operation the conductive layer 184 is capacitively coupled to the conductive leads 118 and 120. This affects the electrical characteristics of the RFID interposer 110. It will be appreciated that the capacitive characteristics of the electrical coupling between the conductive layer 184 and the conductive leads 118 and 120 depend upon the thickness of the dielectric material between the conductive layer 184 and the conductive leads 118 and 120. By controlling the thickness of the intervening dielectric material, the electrical characteristics of the RFID device 110 may be controlled or tuned to some extent. In many methods for forming the folded interposer ends 112 and 114, pressure is used to squeeze portions of the dielectric layer 116. The thickness of the dielectric layer 116 may be permanently altered by the application of pressure, especially in securement methods that involve heating and reflowing of material of the dielectric layer 116. Using such methods, the securing the folded interposer ends 112 and 114 may also be used for tuning the electrical characteristics of the RFID interposer 110. Controlled amounts of pressure in one or more sets of rollers may be used to set the thickness of the dielectric material 116 between the conductive layer 184 and the conductive leads 118 and 120. Different pressures may be used to tune the RFID interposer 110 for different types of antennas, and/or for different types of chips. Alternatively or in addition, the pressure used in securement of the interposer ends 112 and 114 may be used to tune individual RFID interposers based on individual characteristics of each interposer. It will be appreciated that the pressure, perhaps in conjunction with heating, may be used after the ends 112 and 114 have been initially folded over and secured. That is, pressure may be applied to alter capacitive characteristics independent of an operation to secure the folded interposer ends 112 and 114.

Figure 12:
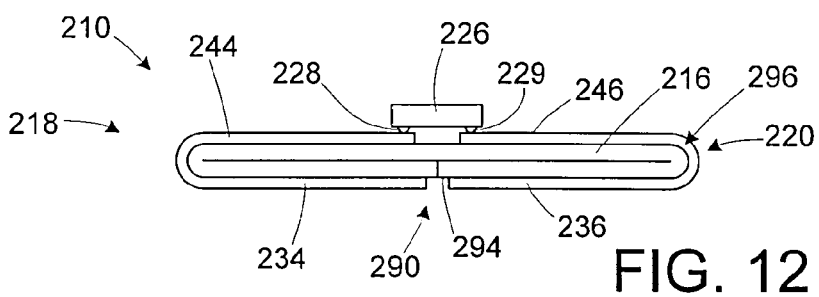
FIG. 12 is a side view of another alternate embodiment of the RFID device in accordance with the present invention, in a symmetric configuration.
Figure 13:
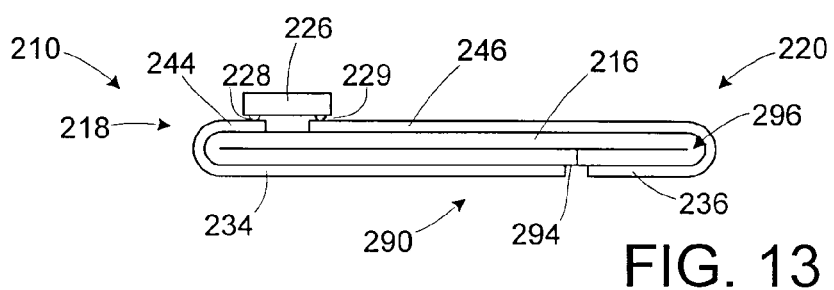
FIG. 13 is a side view of the RFID device of FIG. 12, in an asymmetric configuration.

FIGS. 12 and 13 illustrate another embodiment, an interposer 210 that has long conductive leads 218 and 220 that may be folded so as to have to produce themselves a conductive layer 290 on an underside 294 of a folded dielectric substrate 296. The folded substrate 296 consists of folded layers of a substrate 216 upon which the conductive leads 218 and 220 are attached. The conductive layer 290 is made up of folded conductive lead end portions 234 and 236. The conductive lead end portions 234 and 236 extend across most of the lower surface of the folded dielectric substrate 216, but do not make contact with one another. The folded conductive lead end portions 234 and 236 cover most of the underside of the substrate 216, and thus overlap most of conductive lead central portions 244 and 246. The folded end portions 234 and 236 may thus function in a manner similar to that of the conductive layer 184. That is, the conductive lead end portions 234 and 236 may be capacitively coupled to the conductive lead central portions 244 and 246 that provide a parallel overlap with the end portions 234 and 236. This capacitive coupling may influence electrical characteristics of the interposer 210.

It will be appreciated that the electrical characteristics of the interposer 210 may be controlled by controlling the way that interposer ends 212 and 214 are folded. FIG. 12 shows a symmetric folding, with a chip 226 located over the middle of the folded substrate 296. In the symmetric configuration in FIG. 12 the folded conductive lead end portions 234 and 236 are symmetrically underneath the conductive lead central portions 244 and 246. Chip contacts 228 and 229 overlie respective folded conductive lead end portions 234 and 236.

FIG. 13 shows an asymmetric folding configuration of the interposer 210. The asymmetric folding configuration 210 may be the same as the symmetric configuration shown in FIG. 12, except for the difference in the folding. In the illustrated asymmetric configuration the conductive lead end portion 234 is longer than the conductive lead end portion 236. The conductive lead central portion 246 is longer than the conductive lead central portion 244 by a corresponding amount. The chip 226 is located to one side of the folded substrate 296. The chip contacts 228 and 229 are in contact with the conductive lead central portions 244 and 246, respectively. As is shown in FIG. 13, both of the chip contacts 228 and 229 may overlie the conductive lead end portion 234. Altering the position of the folding of the interposer 210 from the symmetric configuration shown in FIG. 12 changes the electrical coupling between the various parts of the interposer 210. This changes the electrical characteristics of the interposer 210, effectively tuning the interposer 210 merely by changing the fold locations. It will be appreciated that changing the fold locations for the interposer 210 may be accomplished by altering the position in which the interposer 210 enters a turning die or other folding device.

It will be further appreciated that a wide variety of alternatives are possible for the configuration of the interposer 210. The interposer ends may overlap each other in part, to give one example. Longer ends of the substrate 216 may be used to cover parts of either of the conductive lead end portions 234 and 236.

Figure 14:
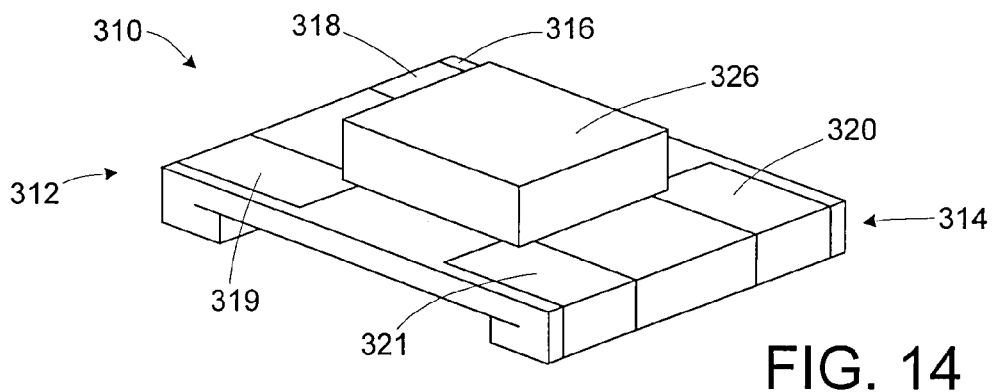
FIG. 14 is an oblique view of still another embodiment of the RFID device in accordance with the present invention.
Figure 15:
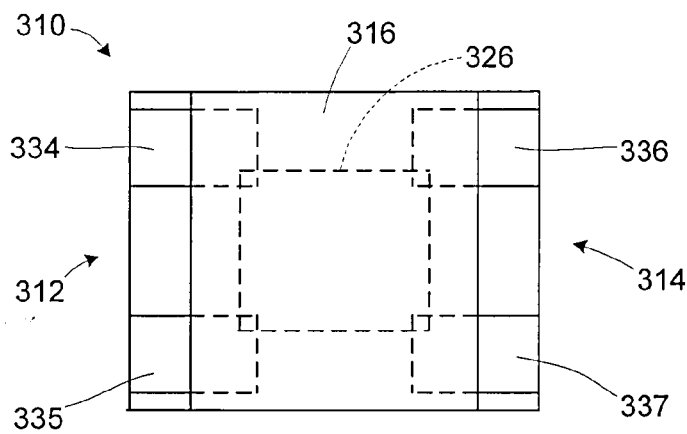
FIG. 15 is a bottom of the RFID device of FIG. 14.

FIGS. 14 and 15 show another alternate embodiment, an interposer 310 that has folded ends 312 and 314. The interposer 310 has four conductive leads 318, 319, 320, and 321 on a substrate 316. The conductive leads 318-321 produce four respective folded conductive lead end portions 334, 335, 336, and 337 when the ends 312 and 314 are folded over. The conductive leads 318 and 320 are coupled to signal contacts of a chip 326. The conductive leads 319 and 321 are coupled to ground contacts of the chip 326. This configuration, with two signal contacts in line on one side of the chip 326, and two ground leads in line on the other side of the chip 326, is a common configuration for RFID chips.

Figure 16:
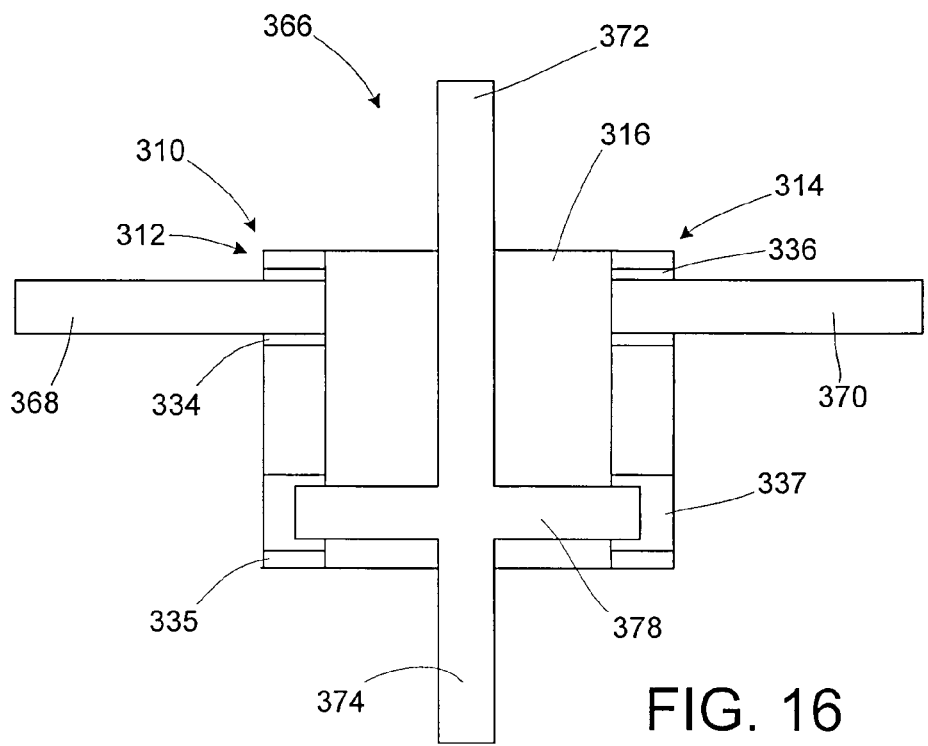
FIG. 16 is a bottom view of the RFID device of FIG. 14 coupled to a crossed dipole antenna.

Referring now in addition to FIG. 16, the interposer 310 is shown coupled to a crossed dipole antenna 366. The crossed dipole antenna 366 includes a pair of signal arms 368 and 370 in a single line. The crossed dipole antenna 366 (an example of a broad category of coupling structures) also includes a pair of ground arms 372 and 374 in a line, and substantially perpendicular to the signal arms 368 and 370. The ground arms 372 and 374 are electrically coupled together by a short perpendicular crosspiece of conductive material 378. The interposer 310 engages the crossed dipole antenna by having the signal conductive lead end portions 334 and 336 in contact with the signal arms 368 and 370. The ground conductive lead end portions 335 and 337 are in contact with respective ends of the crosspiece 378 of the crossed dipole antenna 366. This places both of the ground contacts of the chip 328 in electrical connection with the ground arms 372 and 374 of the crossed dipole antenna 366. The interposer 310 thus provides a way of coupling a common four-contact chip, with side-by-side signal contacts and side-by-side ground contacts, with a crossed dipole antenna configuration in which signal arms and ground arms alternate.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An interposer for an RFID device, the interposer comprising:
    a dielectric substrate; and
    conductive leads on an upper surface of the dielectric substrate;
    wherein ends of the interposer are folded to put substrate end portions and conductive lead end portions underneath a central substrate portion and conductive lead central portions, with the conductive lead end portions facing downward.

2. The interposer of claim 1, wherein the substrate is a polymer substrate.

3. The interposer of claim 1, wherein the substrate is a paper substrate.

4. The interposer of claim 1, further comprising a chip attached to the central conductive lead portions on the top side of the substrate.

5. The interposer of claim 1, wherein the substrate end portions are in contact with and attached to a lower surface of the central substrate portion.

6. The interposer of claim 5, wherein the substrate end portions are thermal compression bonded to the central substrate portion.

7. The interposer of claim 5, wherein the substrate end portions are adhesively attached to the central substrate portion.

8. The interposer of claim 1,
    further comprising a conductive layer;
    wherein an upper surface of the conductive layer is attached to a lower surface of the substrate.

9. The interposer of claim 8, wherein the conductive layer is capacitively coupled to the conductive leads.

10. The interposer of claim 9, wherein the substrate end portions are thermal compression bonded to the conductive layer.

11. The interposer of claim 10,
    wherein strength of the capacitive coupling between the conductive layer and the conductive leads varies as a function of pressure used in the thermal compression bonding; and
    wherein the interposer is a tunable interposer tunable by selecting the pressure used in the thermal compression bonding.

12. The interposer of claim 8, wherein the substrate end portions cover substantially all of a lower surface of the conductive layer.

13. The interposer of claim 1, wherein the conductive lead end portions overlap most of the conductive lead central portions.

14. The interposer of claim 13, further comprising a chip attached to the central conductive lead portions on the top side of the substrate.

15. The interposer of claim 14, wherein the chip is symmetrically located relative to the conductive lead end portions.

16. The interposer of claim 14, wherein the chip is asymmetrically located relative to the conductive lead end portions.

17. The interposer of claim 1, wherein the conductive leads to not extend to a center of a lower surface of the interposer.

18. The interposer of claim 17,
    as part of an RFID device;
    wherein the conductive lead end portions are coupled to a coupling structure of the RFID device; and
    wherein conductive material of the coupling structure is in contact with the center of the lower surface of the interposer.

19. The interposer of claim 1, wherein the conductive leads include at least four conductive leads.

20. An interposer for an RFID device, the interposer comprising:
    a dielectric substrate; and
    conductive leads on an upper surface of the dielectric substrate;
    wherein ends of the interposer transition from a substantially-planar first configuration in a center of the interposer to a second configuration in which conductive lead end portions are offset from conductive lead central portions of the conductive leads.

21. The interposer of claim 20, wherein the conductive lead end portions are offset from the conductive lead central portions in a direction substantially perpendicular to a plane of the substantially-planar first configuration.

22. The interposer of claim 21, wherein the ends are folded ends.

* * * * *